United States Patent [19]

Rudolph et al.

[11] 3,959,972

[45] June 1, 1976

[54] POWER PLANT PROCESS

[75] Inventors: Paul Rudolph, Bad Homburg; Emil Supp, Dietzenbach, both of Germany

[73] Assignee: Metallgesellschaft Aktiengesellschaft, Frankfurt am Main, Germany

[22] Filed: Apr. 10, 1975

[21] Appl. No.: 566,862

[30] Foreign Application Priority Data

May 30, 1974 Germany............................ 2425939

[52] U.S. Cl.................................. 60/651; 60/648; 60/652; 60/659; 60/672
[51] Int. Cl.² ................... F01K 25/14; F01K 13/00
[58] Field of Search ............... 60/39.18 B, 648, 652, 60/649, 651, 671, 659, 650, 682

[56] References Cited
UNITED STATES PATENTS 3,183,666   5/1965   Jackson ............................ 60/648 X
3,296,449   1/1967   Plust et al. ......................... 123/3 X Primary Examiner—Allen M. Ostrager
Attorney, Agent, or Firm—Burgess, Dinklage & Sprung

[57] ABSTRACT

Fossil fuels such as coal or oil are gasified by treatment under superatmospheric pressures with oxygen containing gasifying agents to produce a primary gas containing carbon monoxide and hydrogen. The primary gas is desulfurized and converted in increasing portion into methanol which is stored as the load on the power plant increases. An increasing proportion of the stored methanol is used in addition to desulfurized primary gas in the power plant as the load on the power plant increases.

4 Claims, 1 Drawing Figure

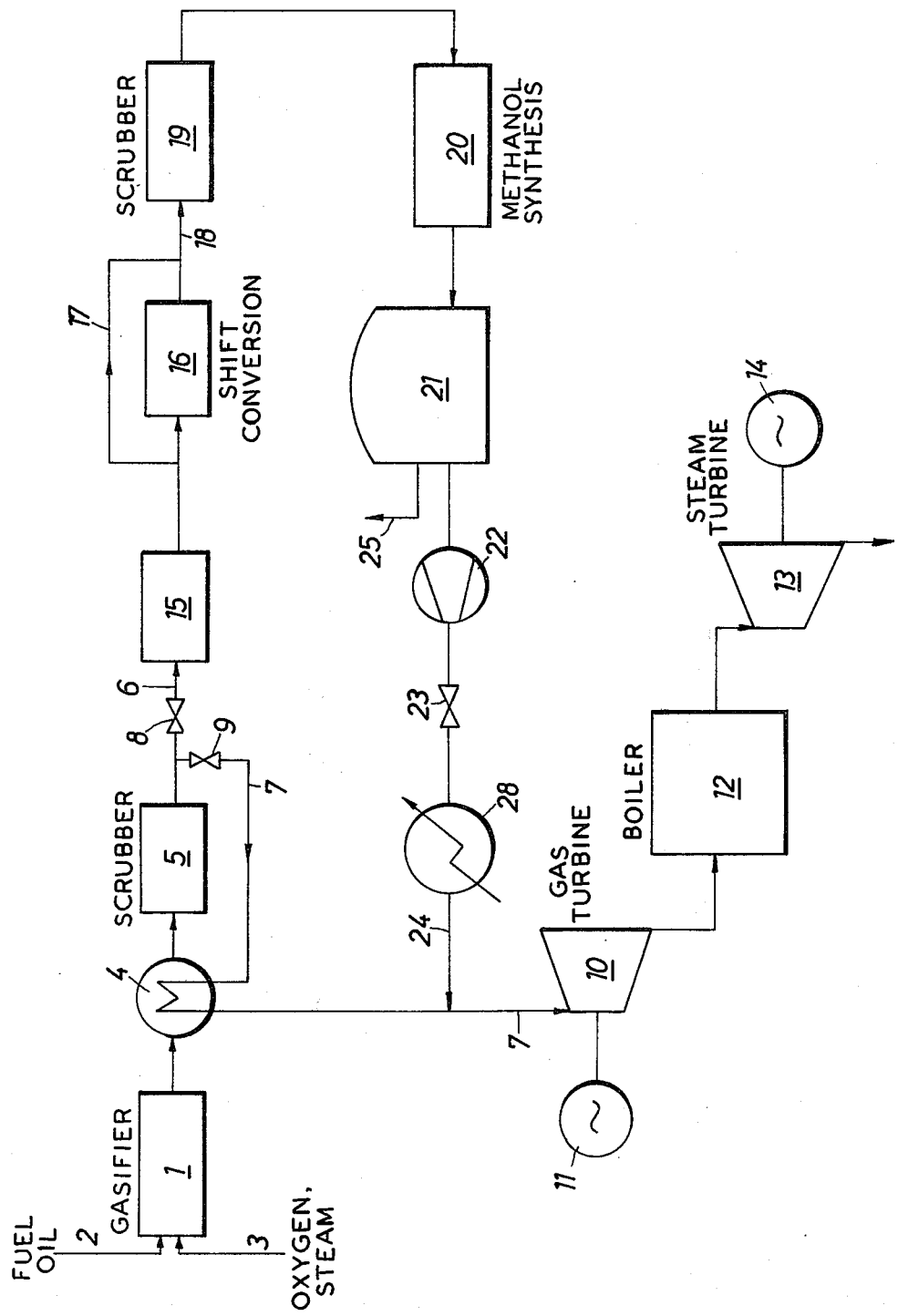

POWER PLANT PROCESS

BACKGROUND

This invention relates to a method of operating a power plant, preferably for peak loads. Such power plants must often be adjusted very quickly to a different load. Besides, the power is reduced mostly to zero at night and also during weekends. For this reason a fast control of the fuel supply is required so that the operation of the power plant can be adjusted to changing loads.

SUMMARY

This is accomplished according to the invention in that fossil fuels are gasified by a treatment under superatmospheric pressure with oxygen-containing gasifying agents to procude a primary gas which contains carbon monoxide and hydrogen, an increasing proportion of said primary gas is converted into methanol for storage as the load on the power plant decreases, and an increasing proportion of stored methanol is used in addition to desulfurized gas in the power plant as the load on the power plant increases. The fuels to be degasified may consist of liquid hydrocarbons or coal. The gasified agent may additionally contain water vapor or in some cases also carbon dioxide.

DESCRIPTION

The use of interconnected means for producing fuel gas and means for producing methanol enables a very fast control because methanol from the stored supply is used as a fuel in case of a sudden load increase and the methanol production rate can be increased in case of a sudden load decrease. A highly desirable feature resides in that the gas production rate need not be changed in case of cahnge of the load on the power plant.

According to a preferred feature of the method, the production of primary gas is continued when the power plant is at a standstill and the primary gas produced during this time is used to produce methanol for storage. In this case it will be sufficient to dimension the means for producing and purifying the gas, inclusive of the air-separating plant used to produce oxygen, for about 50–70 % of the output rate which would be required if methanol were not produced and stored.

An example of the method based on the gasification of oil will be explained more fully with reference to the drawing.

High-boiling hydrocarbons, such as heavy fuel oil, are supplied to a gasifying reactor 1 through conduit 2. In the reactor 1, the hydrocarbons are gasified at temperatures of about 1200°–1500°C under superatmospheric pressures, frequently under pressures in excess of 20 kg/cm², by a treatment with oxygen and water vapor from conduit 3. The partial oxidation results in known manner in a product gas, which will also be referred to hereinafter as a primary gas and which contains mainly carbon monoxide and hydrogen.

This primary gas is initially at a temperature highly above 1000°C and is cooled by a stagewise heat exchange, in which the sensible heat of the gas is used to produce high-pressure steam. In the drawing, the cooling means are represented in simplified form by a heat exchanger 4. The final temperature of the cooled primary gas will depend on the requirements of a succeeding scrubber 5, in which a major part of the impurities, particularly sulfur compounds, is removed from the primary gas.

If the gas is scrubbed with liquid methanol, an inlet temperature of the primary gas of about 30°C will be desired. The scrubber 5 may alternatively be supplied in known manner with hot potash solution.

The scrubbed primary gas can then be selectively supplied in partial streams through conduit 6 to a methanol synthesis plant or as a fuel gas through conduit 7 directly to the power plant for the production of electric energy. The distribution of the scrubbed primary gas to the conduits 6 and 7 is controlled by adjustable valves 8 and 9. The gas flowing in conduit 7 is reheated in a part of the heat exchanger 4 and is then expanded in a gas turbine 10, which drives a generator 11. The expanded gas from the gas turbine is fed to a steam boiler 12 and is burnt therein for the production of steam. The steam from the boiler 12 drives a steam turbine 13, which is connected to a generator 14.

Methanol is produced in known manner from the primary gas flowing in conduit 6. The process is described, e.g., in the Printed German application No. 2,024,301. The gas is first treated in a fine purification unit 15 to remove also the remaining sulfur compounds, which would otherwise act as catalyst poisons. The fine purification may be effected, e.g., with activated carbon. A partial stream of the purified gas is then passed through a shift conversion unit 16, in which $CO + H_2O$ at a temperature of 350°–550°C and a pressure of > 20 ata are catalytically reacted to form $CO_2 + H_2$. The shift conversion is carried out with a catalyst consisting mainly of iron oxide at temperatures of 350°–550°C. The shift-converted partial stream is combined in conduit 18 with the partial stream which has not been shift-converted and comes from conduit 17. The combined streams are passed through another scrubber 19, in which most of the remaining carbon dioxide is removed so that the gas has a composition which is proper for the synthesis of methanol in a succeeding unit 20. For this purpose the volumetric proportions of the various components of the gas must satisfy the condition that $(H_2-CO_2) : (CO + CO_2)$ is larger than or equal to 2.01. The methanol syntheses is carried out at a temperature of 200°–300°C and a pressure of > 20 ata with the help of a copper containing catalyst according to German Pat. No. 2,024,301.

The desired methanol is produced by a catalytic reaction in the methanol synthesis unit 20 and is stored as a liquid in a tank 21.

When required, methanol is drawn from the tank 21 by a pump 22 and is fed through an opened valve 23, an evaporator 28, and conduit 24 into conduit 7. This mode of operation will be adopted when the load on the power plant is so high that the fuel gas from conduit 7 is not sufficient alone.

Alternatively, liquid methanol may be drawn from the tank 21 through a conduit 25 and be used to scrub the gas in 5 and/or 19.

Because during daytime when the power plant is under the usual load about 10% of the primary gas are fed to the methanol synthesis unit to maintain the same in operation, whereas the entire primary gas is available for this purpose at night and during weekends, the tank 21 will always contain a sufficiently large supply of methanol.

What is claimed is:

1. Power plant process which comprises gasifying fossil fuels by treatment under superatmospheric pressure with oxygen-containing gasifying agents to produce a primary gas which contains carbon monoxide and hydrogen, desulfurizing said primary gas, converting an increasing proportion of desulfurized primary gas into methanol for storage as the load on the power plant decreases, and utilizing an increasing proportion of stored methanol in addition to desulfurized primary gas in the power plant as the load on the power plant increases.

2. Process of claim 1 wherein the production of primary gas is continued when the power plant is at a standstill and the primary gas produced during this time is used to produce methanol for storage.

3. Process of claim 1 wherein methanol produced in the method is used to scrub the primary gas.

4. Process of claim 3, wherein the methanol used to scrub the primary gas is treated to remove at least part of its impurities and is then used as a fuel.

* * * * *